United States Patent [19]
Rosenberger

[11] 3,743,377
[45] July 3, 1973

[54] DUAL POWER MICROSCOPE
[75] Inventor: Harold E. Rosenberger, Rochester, N.Y.
[73] Assignee: Bausch & Lomb Incorporated, Rochester, N.Y.
[22] Filed: Jan. 14, 1972
[21] Appl. No.: 217,811

[52] U.S. Cl. .................. 350/37, 350/46, 350/84
[51] Int. Cl. ............................................. G02b 7/04
[58] Field of Search .................... 350/37, 40–44, 350/84, 46

[56] References Cited
UNITED STATES PATENTS
3,353,891 11/1967 Rosenberger ................ 350/43 X Primary Examiner—David H. Rubin
Attorney—Frank C. Parker et al.

[57] ABSTRACT

A dual power microscope comprises an assembly of eyepiece and objective lenses in fixed relationship to one another and an assembly of specimen stage and a negative relay lens in fixed relationship to one another, the two assemblies being coaxially relatively slidable and the relay being disposed between the objective and the eyepiece. When the eyepiece-objective assembly has been pulled away from the specimen stage a low magnification image is seen; and when pushed toward the stage a high magnification image is seen.

2 Claims, 3 Drawing Figures

PATENTED JUL 3 1973

DUAL POWER MICROSCOPE

CROSS-REFERENCES TO RELATED APPLICATIONS

The present invention is related to the invention described in concurrently filed and commonly assigned application Ser. No. 217,812 of Donald D. White for Dual Powered Microscope.

BACKGROUND OF THE INVENTION

1. Field of the Invention

The field of the invention is variable magnification optical systems, and more specifically dual power optical systems having a finite object conjugate.

2. Description of the Prior Art

Inexpensive microscopes for children in elementary schools have been mostly limited to fixed power instruments, which restrict the extent to which a child's awakening interest in the minute, natural world about him can be stimulated. While there have been some dual power instruments which afford both low and high power views, they have suffered in the main from either high costs if their image quality was good, or poor image quality if their costs approached what our school districts can afford.

Axially movable intermediate lenses between fixed objective and eyepiece lenses are known in the telescope art where the object conjugate is infinite. See, for example U.S. Pat. No. 2,479,792 to R.B. Tackaberry. In microscopes, where the object conjugate is not only finite, but usually quite short, at least two moving intermediate lenses, each following a different path, have been used. Since the actuating mechanisms for such complex movements are quite costly there is little prospect for their being used in inexpensive microscopes.

SUMMARY OF THE INVENTION

A good, but inexpensive, dual power microscope which would permit a child to obtain both an overall macroscopic view of a specimen at a relatively low power and a detailed, structural microscopic view at a substantially higher power would therefore be a most welcome development.

In order to achieve a dual power microscope of excellent image quality while retaining the most simple possible mechanical accommodations for it I have worked out a set of optical conditions under which a microscope may consist of only two basic units which, with a single positive relative movement of the units between two discrete positions, changes magnification. One unit includes both an objective lens and an eyepiece lens in fixed spatial relationship to each other. The other unit includes a specimen stage and a relay lens in fixed spatial relationship to each other, the relay lens being disposed between the objective and the eyepiece. The microscope is completed with slide means for axial adjustment of the two units, and base and housing means. Any of the base, slide and housing means might well form a portion of either or both basic units of the microscope.

DETAILED DESCRIPTION OF THE INVENTION

1. Conditions for the Design

Lower case letters denote conditions at the lower magnification setting.

Capital letters denote conditions at the higher magnification settings. The objective lens 52 and relay lens 32 are designated lenses A and B respectively.

The object distances $d_1$ and $D_1$ are negative when the object lies to the left of lens A.

The objective and eyepiece are mechanically linked and move in a 1:1 ratio over the distance C from the magnification settings $m$ to $M$ and $-C$ from $M$ to $m$.

The focal lengths of the first two lenses are designated $F_A$ and $F_B$ respectively.

When the object to image distance $k$ and the magnification $m$ are chosen, the object distance $d_1$, lens separation $t$ and image distance $d_2$ are predetermined by the following relationship:

$$t = \frac{1}{2} [k \pm \sqrt{k^2 - 4 F_A F_B a - 4k(F_A + F_B)}]$$

Where $$a = (1-m)^2/m$$
$$d_1 = -F_A [k - t(1-m)]/F_A (1-m) + m t$$
$$d_2 = k + d_1 - t$$

Simultaneously, the higher magnification M, the object to image distance K and the objective-eyepiece motion C are predetermined by the following relationship:

$$C = -Q \pm \sqrt{Q^2 - 4R}/2$$

Where $$Q = d_1 + t - d_2$$
$$R = (F_A + F_B + d_1 - d_2) t - (F_A + d_2) d_1 - (F_A - d_2)F_B$$
$$M = (F_A/D_1 + F_A) \times (F_B - D_2/F_B)$$

Where $$D_1 = d_1 + C$$
$$D_2 = d_2 - C$$
$$K = k - C$$

Figure 1:
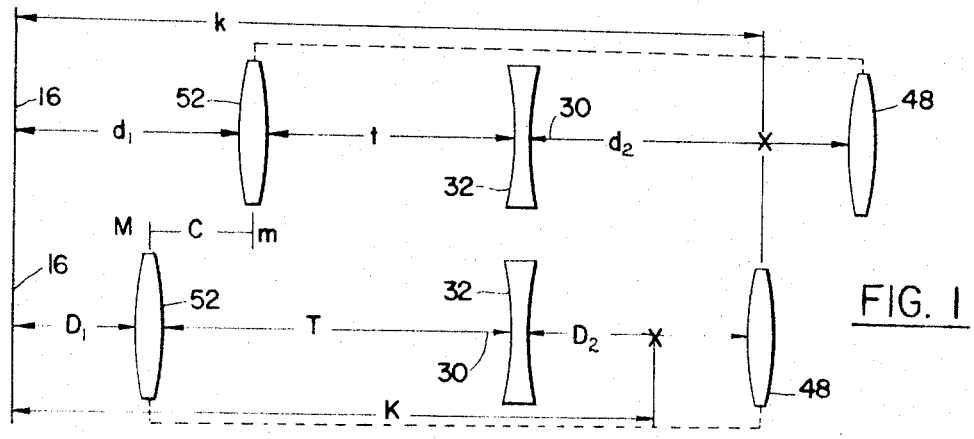
FIG. 1 is an optical schematic diagram of the microscope of my invention at low and high power settings, showing the relationships between them.

It follows from FIG. 1 that $T = K + D_1 - D_2$.

2. DESCRIPTION OF THE PREFERRED EMBODIMENT

A. OPTICAL DESIGN

By way of illustration, an example of a dual power optical system is given in the table below. The values preceded by asterisks were chosen; all other values are predetermined and were calculated by the methods above disclosed in terms of $F_A$ taken as unity. It will be understood upon noting the quadratic relationship involved that not all values for the chosen parameters lead to real and/or useful solutions. The negative magnifications signify that the images as magnified are inverted.

* $F_A = 1.000$
* $F_B = -1.2000$
* $m = -3.000X$
* $k = 12.000$
$d_1 = -3.578$
$t = 0.343$
$d_2 = 8.079$ $C = 2.181$
$M = -14.914X$
$K = 9.819$
$D_1 = -1.397$
$T = 2.524$
$D_2 = 5.898$

B. MECHANICAL DESIGN

Figure 2:
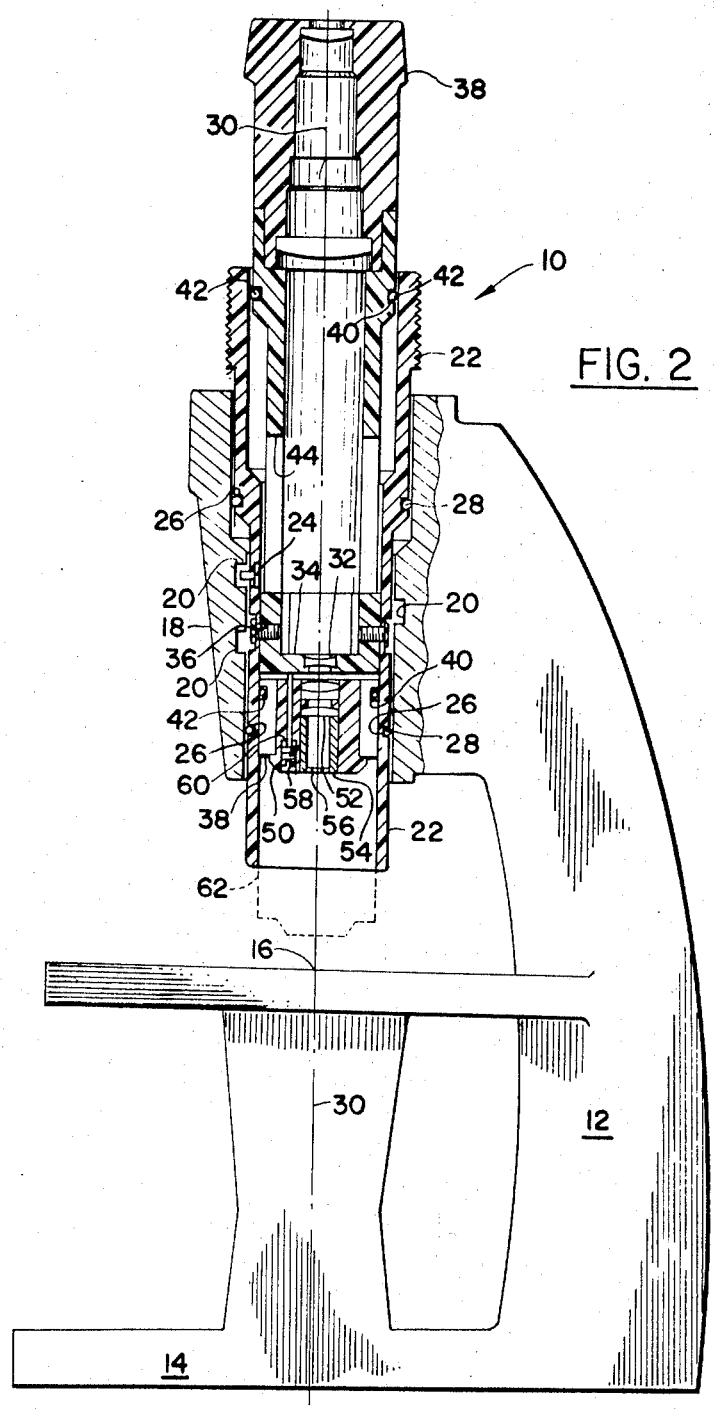
FIG. 2 is a sectional profile of a microscope demonstrating the mechanical development of my invention.

In FIG. 2, the microscope is designated generally as 10. A support pillar 12 rises from a base 14 and carries a specimen stage 16 as well as a microscope receiving tube 18. The interior of the tube 18 is formed to define a helical groove 20. A relay carrier 22, also of tubular shape, is receivable in the tube 18. The carrier 22 is molded around a pin 24 which is cooperative with the groove 20 to advance the carrier 22 along the axis of the tube 18 when the carrier is rotated relative to the tube. The exterior of the carrier 22 defines a plurality of circumferential grooves 26 in which O-rings 28 are fitted. The O-rings 28 are slightly oversized relative to the outline of the grooves 26 and are preferably of a resiliently deformable material (such as silicone rubber) chosen for a sliding compatibility with the interior walls of the receiving tube 18. The O-rings 28 serve to hold the carrier 22 centered on the microscope's axis 30 and also are the bearings which permit the carrier 22 to be rotated by means of the pin 24 and the helical groove 20.

A relay lens 32 is pressed into a cooperative aperture formed in a relay lens mounting cell 34 and the latter is fastened by means of the eyelets 36 to the carrier 22.

Meanwhile a tubular slide 38 defining circumferential grooves 40 in which are fitted O-rings 42, is coaxially received in an interior bore in the relay carrier 22, the O-rings 42 being of pliant, resiliently deformable material and serving to center the slide to the axis 30 and to provide a slide bearing surface for the slide 38 to move axially within the carrier 22.

Figure 3:
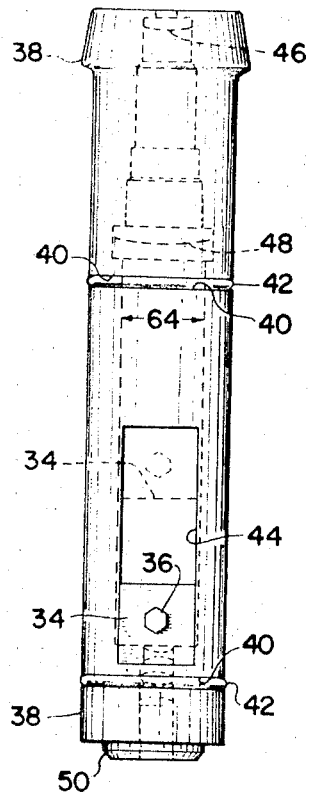
FIG. 3 is a side view of a part of the microscope, showing the means for relative sliding of the two main assemblies.

Viewed from the side, as in FIG. 3, the slide 38 is seen to define a rectangular aperture 44 of a width cooperatively corresponding with the vertical sides of the relay lens cell 34.

The slide 38 serves as a mount for the eyepiece lenses 46, 48, and for the objective lens cell 50. The objective lenses 52 are retained in a central bore of the cell 50, coaxial with the axis 30 of the microscope, by a member 54 which additionally serves to define an aperture stop 56. A stop screw 58 is threaded into a second bore 60 located eccentrically in the cell 50.

During assembly the relay lens cell 34 is first loosely placed in the aperture 44 of the slide 38, which is then placed within the interior bore of the carrier 22 and the relay cell 34 is then rigidly affixed by means of the eyelets 36 to the carrier 22. Thus, the slide 38 is constrained within the carrier 22 for sliding motion through an excursion, which is defined at the upper end by the top of the relay lens cell 34 interfering with the top of the aperture 44, and at the bottom by the adjustable stop screw 58 bumping the bottom of the relay lens cell 34. The microscope assembly is completed by insertion of the relay carrier 22 into the microscope receiving tube 18, the pin 24 being guided into the helical groove 20.

Thus, when fully assembled the slide 38 serves to hold the objective lens 52 in fixed spatial relationship to the eyepiece lenses 46, 48, while the support pillar 12 serves to hold the relay lens 32 in fixed spatial relationship to the specimen stage 16 (it being appreciated that the carrier 22 may be rotated and moved along the axis 30 for focusing of the microscope, but that once focused the conjugate from the relay lens 32 to the stage 16 remains fixed during the actual use of the microscope).

As shown in FIG. 2, with the tip of the stop screw 58 engaged with the bottom of the relay lens cell 34, the microscope is in the low power position. When the objective lens and eyepiece lenses incorporated in the slide 38 are moved downward as a unit, by pushing the slide 38 downward until the objective lens cell occupies the position shown in dotted outline 62, the microscope is brought to the high power position.

In practice the high power position is realized by depressing the slide 38 until the top of the aperture 44 is engaged with the top of the relay lens cell 34. The carrier 22 is then rotated to bring a specimen slide of standard thickness on the stage 16 into focus, it being recalled that at high power the focal envelope is relatively narrow. The slide 38 is then raised until the image is observed to be in focus in the eyepiece focal plane 64 at the low power position, the low power focal envelope being significantly wider than at the high power setting. The stop screw 58 is then adjusted to meet the relay lens when a condition of sharpest focus is observed. The range of travel of the slide 38 then corresponds to the dimension C discussed above under the heading "Conditions for the Design."

I claim:

1. A microscope having, in alignment along an optical axis:

a. a stage and relay assembly comprising a specimen stage, relay lens means and mechanical linkage means for disposing said relay lens means in fixed position relative to said specimen stage;

b. an eyepiece and objective assembly comprising objective lens means, eyepiece lens means and mechanical linkage means for disposing said eyepiece lens means in fixed position relative to said objective lens means; and c. base, slide and housing means for slidably and coaxially mounting said two assemblies, with said relay lens means disposed between said objective lens means and said eyepiece lens means, for relative motion along said axis through an excursion, said excursion defining at least two positions of optical cooperation among said objective lens means, said relay lens means, said eyepiece lens means and said specimen stage, one for low magnification viewing and one for high magnification viewing of a specimen on said stage.

2. The microscope of claim 1 wherein said objective lens means has a focal length $F_A$ and said relay lens means has a focal length $F_B$, measurements along said optical axis are taken from said objective lens means positive toward the image side, low magnification conditions are designated by small case letters, high magnification conditions are designated by large case letters;

$D_1$, $d_1$ represent the object distances;

$T$, $t$ represent the separations of the objective lens means from said relay lens means;

$D_2$, $D_2$ represent the separation of the relay lens means from the eyepiece focal plane;

$K$, $k$ represent the distance from the object plane to the eyepiece focal plane;

$C$ represents the length of said excursion measured in the direction of the image;

$M$, $m$ represent the degree of magnification of a specimen in the object plane measured in the eyepiece focal plane;

$$a = (1-m)^2/m;$$
$$Q = d_1 + t - d_2;$$
$$R = (F_A + F_B + d_1 - d_2)t - (F_A + d_2)d_1 - (F_A - d_2)F_B;$$
$$t = \tfrac{1}{2}[k \pm \sqrt{k^2 - 4 F_A F_B a - 4k(F_A + F_B)}\,];$$
$$d_1 = -F_A[k - t(1-m)]/F_A(1-m) + m\,t;$$
$$d_2 = k + d_1 - t;$$
$$C = -Q \pm \sqrt{Q^2 - 4R}/2;$$
$$M = (F_A/D_1 + F_A) \times (F_B - D_2/F_B);$$

and $$D_1 = d_1 + C;$$
$$D_2 = d_2 - C;$$
$$K = k - C;$$

$$T = K + D_1 - D_2.$$

* * * * *